Dec. 13, 1960  J. N. BEEBE ET AL  2,964,729
VELOCITY-DETERMINING SYSTEM
Filed Sept. 27, 1954
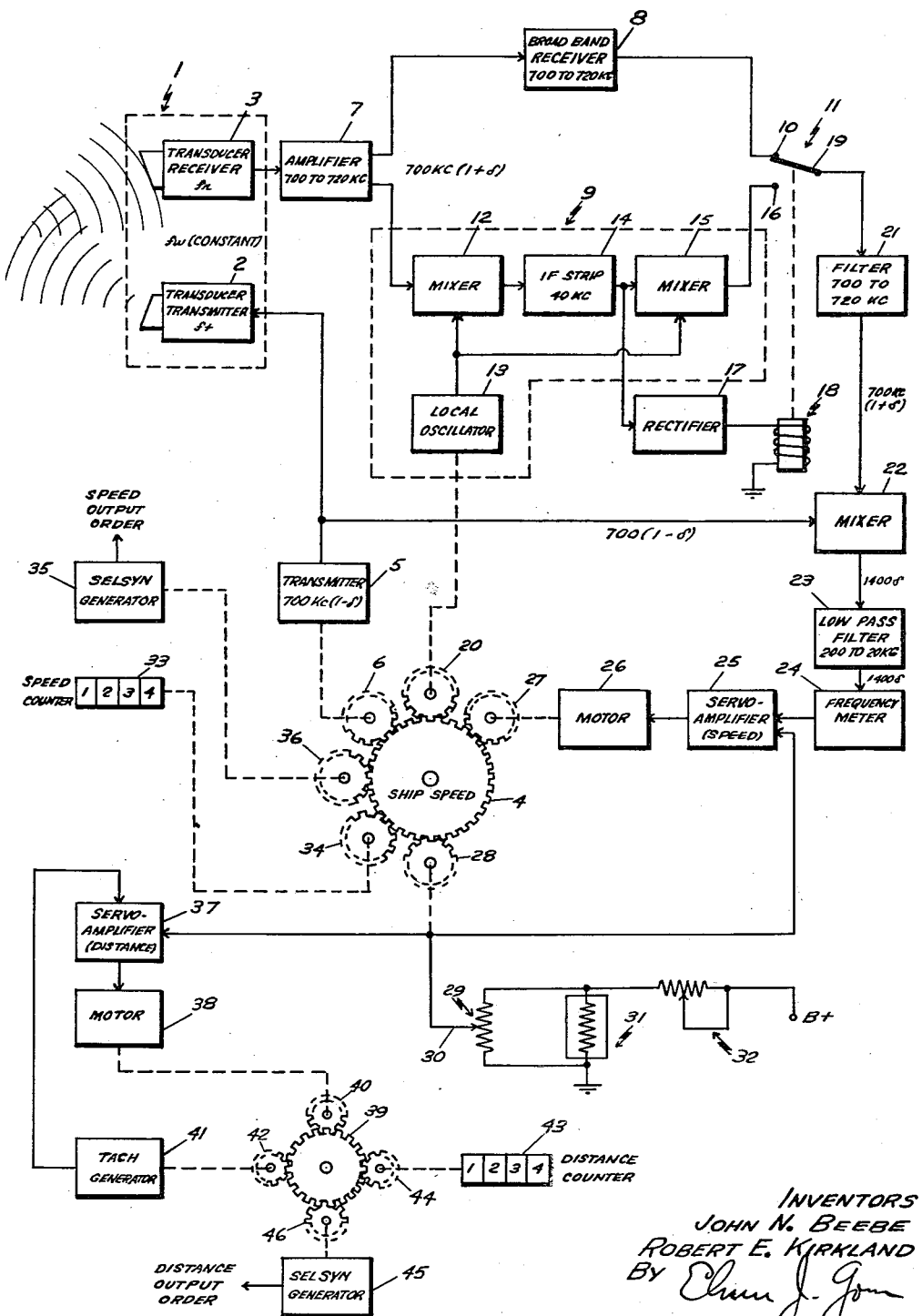
INVENTORS
JOHN N. BEEBE
ROBERT E. KIRKLAND
By
ATTORNEY 2,964,729
Patented Dec. 13, 1960

2,964,729

VELOCITY-DETERMINING SYSTEM

John N. Beebe, Millis, and Robert E. Kirkland, Belmont, Mass., assignors to Raytheon Company, a corporation of Delaware Filed Sept. 27, 1954, Ser. No. 458,511

6 Claims. (Cl. 340—3)

This invention relates to a velocity-determining apparatus, and more particularly, to an acoustic log system whereby the difference or doppler frequency between the transmitted and received energy waves may be determined.

This invention discloses a particular system whereby transmitted and received frequencies may be accurately compared to determine the frequency difference. It is known that the velocity of a ship traveling through the water may be determined by transmitting sonic frequency energy from the ship through the water in a direction parallel to the direction of the motion of the ship, and receiving sonic frequencies which are reflected back from discontinuities in the water, such as air bubbles, impurities, and surface conditions, and comparing the frequency of the received energy with the frequency of the transmitted energy. The difference frequency, sometimes called the doppler frequency, will vary with the velocity of the ship and therefore the velocity of the ship may be measured in terms of this frequency. It is the purpose of the system to accurately determine and measure the difference frequency, and to use the difference frequency, which is a measure of ship speed, to change the transmitted frequency, thereby creating a self-balancing closed loop servo system.

The formula for doppler frequencies when worked out for a constant radiated frequency and also for a constant received frequency shows that there is a non-linearity between the ship's speed indicating signal and the actual ship's speed. This non-linearity is caused by the fact that the frequency in the medium is dependent on the speed of the ship in the medium. It has been determined that if the frequency in the medium is kept constant, the problem of compensating for a non-linear change is simplified.

The object of this invention therefore is to keep the frequency in the medium constant. This is possible since a tranducer moving through the water has three frequencies which can be identified, $f_t$ which is supplied to the transducer for transmission, $f_w$ which is the frequency observed by the transducer which has no motion relative to the water, and $f_r$ which the moving transducer receives. On transmission, the wavelength in the water is shortened because the same number of cycles which would occupy $c$ feet of length at zero speed now occupy $c-v$ feet at $v$ feet per second speed where $c$ is the velocity of sound in water and $v$ is the velocity of the ship. The wavelength is therefore shortened to the fractional value $$\frac{c-v}{c}$$

and the frequency increased by the reciprocal. Mathematically, this is shown by the following equations:

$$f_w = f_t\left(\frac{c}{c-v}\right) \quad (1)$$

or $$f_w = f_t \frac{1}{1-v/c} \quad (2)$$

On reception, a larger number of cycles will be received in a given length of time so that the received frequency will be:

$$f_r = \left(\frac{c+v}{c}\right)f_w \quad (3)$$

or $$f_r = f_w\left(1+\frac{v}{c}\right) \quad (4)$$

The doppler beat frequency, which is representative of ship speed, is the difference between the transmitted frequency $f_t$ and the received frequency $f_r$ and is represented as follows:

$$F_d = f_r - f_t \quad (5)$$

Equation 4 is substituted in Equation 5 to obtain:

$$F_d = f_w\left(1+\frac{v}{c}\right) - f_t \quad (6)$$

or $$= \frac{f_t}{1-\frac{v}{c}}\left(\frac{2v}{c}\right) \quad (7)$$

By factoring out and substituting Equation 2 in Equation 7 there is obtained:

$$F_d = f_w\left(\frac{2v}{c}\right) \quad (8)$$

It will be noted that there is an exact linear relationship between the doppler frequency and the ship's speed if the frequency which exists in the medium is kept constant.

By rewriting Equation 2 in terms of $f_w$ we obtain:

$$f_t = f_w\left(1-\frac{v}{c}\right) \quad (9)$$

A comparison of Equation 4 with Equation 9 will show that where the frequency in the medium can be maintained constant, the received frequency $f_r$ will be higher than the frequency in the medium $f_w$, by exactly the same amount that the transmitted frequency is lower than the frequency $f_w$.

Further objects and advantages of this invention will be apparent as the description progresses, reference being made to the accompanying drawing wherein the single figure is a block diagram of the embodiment of the invention.

Referring now to the drawing, there is shown a block diagram illustrating an embodiment of the invention in the form of a complete self-balancing acoustic log.

A dual head section 1 containing a transmitter transducer 2 and a receiving transducer 3, is located in the bow of the ship in such a manner that the transmitting transducer 2 will focus a beam of sound at a point approximately 10 feet ahead of the ship. The receiving transducer 3 having the same focus as the transmitting transducer 2 will pick up the received signal from this point of focus. Both the transmitting transducer 2 and the receiving transducer 3 are located in the water.

By assuming a speed of sound in water of 4730 feet per second and by transmitting a sound beam that will vary in frequency with the ship's speed, it has been determined that by using a carrier frequency of 700 kilocycles, it is necessary to lower the transmitted signal frequency 250 cycles from the carrier of 700 kilocycles for each knot of ship's speed. The actual amount that the transmitting frequency is changed is called $\delta$ and depends on the ship's speed and the velocity of sound in water. It is defined by the following mathematical explanation:

$$\delta = \frac{v}{c} \quad (10)$$

Where:

δ is the frequency-changing ratio from no doppler to full doppler;

v is the velocity of the ship in water; and c is the velocity of sound in the water.

It can be seen that δ is a varying percentage change that depends on the ship's speed. Since gear train 4 represents the corrected ship's speed and since the transmitted frequency must be reduced by a factor $(1-\delta)$, the frequency varying means on transmitter 5 is mechanically coupled to gear train 4, by means of gear 6 thereby providing the means for varying the transmitted frequency. The changed transmitted frequency is 700 kc. $(1-\delta)$ which is a linear change. Since the transmitter 5 drives the transmitting transducer 2, there will be propagated in the water the fixed frequency of 700 kilocycles.

The receiving transducer 3 which is also located in the water, receives the frequencies that are reflected from the transmitted energy emitted by transmitting transducer 2. The output of the receiving transducer 3 is fed into a broad band amplifier 7 in order to increase the signal strength of all the received frequencies. The output of broad band amplifier 7 is fed into the input of a broad band receiver 8 and a superheterodyne receiver 9, connected in parallel. Normally, the received signal is amplified by the broad band receiver 8 and then fed into position 10 of the relay operated switch 11.

In order to have a high signal to noise ratio on the received doppler frequency signal, the signal from the broad band amplifier 7 is also fed into the input of the superheterodyne receiver 9 having a mixer 12, local oscillator 13, I.F. strip 14, and a mixer 15. The output of the superheterodyne receiver 9 is fed to position 16 of the relay operated switch 11. The I.F. strip 14 has a narrow band width for high selectivity. The output of said I.F. strip 14 in addition to going to mixer 15, also goes to a rectifier 17. Connected to the output of rectifier 17 is a relay 18 that will operate the relay operated switch 11. Under normal conditions the superheterodyne receiver 9 will be amplifying the received signal which, in turn, will attract relay 18 and transfer the relay operating arm from position 10 to position 16. If for some reason the doppler frequency should get out of the pass band of I.F. strip 14, the signal going to rectifier 17 will fall off to zero, thereby allowing relay 18 to be de-energized. This action will cause the operating arm 19 to transfer from its energized position, which is position 16, to its de-energized position 10. When this occurs, the output of the broad band receiver 8 will be selected. The broad band receiver 8 has a sufficiently broad pass band channel to deliver a signal of sufficient strength to tune the superheterodyne receiver 9 within the spectrum frequency of the doppler.

As explained previously, the received signal is of the order 700 kc. $(1+\delta)$ which is easily passed by the broad band receiver 8. In order for the superheterodyne receiver 9 to track this changing signal, the local oscillator 13 is mechanically coupled by gear 20 to gear train 4 in the same manner as transmitter 5. Since the transmitter 5 and the local oscillator 13 are connected to the same gear train 4, it is obvious that by a proper choice of gear ratios, a change in ship's speed as represented by a change in the gear train 4, will result in a lowered transmitted frequency and a raising of the local oscillator frequency by the same amount. With this system it is possible to obtain a high degree of selectivity from the superheterodyne receiver 9 and also simplify the tracking problem.

The output of either receiver which is selected by armature arm 19 is fed into a filter 21 to remove all unwanted frequencies. The output of said filter 21 is mixed with a component of the transmitted frequency in mixer 22. The mixer 22 obtains the difference between the received frequency and the transmitted frequency and feeds it into filter 23. Since the received frequency is 700 kc. $(1+\delta)$ and the transmitted frequency is 700 kc. $(1-\delta)$ then it is obvious that the mixer 22 will deliver a frequency of 1400δ to filter 23. Filter 23 is a low pass filter for keeping out all frequencies higher than 1400δ. It is estimated that at a speed of approximately 40 knots, 1400δ will be approximately 20 kilocycles so that filter 23 will have a pass range of about 200 cycles to 20 kilocycles.

The output of filter 23 is fed directly into a frequency meter 24 that will deliver a voltage that is proportional to the input frequency. The output of frequency meter 24 is fed into a servo-amplifier 25 which, in turn, drives a reversible servo motor 26. Motor 26 is mechanically coupled to and drives gear train 4 by means of gear 27. Motor 26 drives the gear train 4 to a position depending on the magnitude of the voltage output of frequency meter 24. When this condition is reached, gear train 4 will indicate the ship's speed. In order to provide a system that is automatic in that the gear train 4 will stop at the correct indicated ship's speed, a gear 28 is mechanically coupled to gear train 4 and the output of this gear is used to operate a potentiometer 29. Therefore, as the gear train 4 is operated by motor 26, the operating arm 30 of potentiometer 29 will be moved to a different position thereby producing a different voltage across the operating arm 30. This voltage is fed back to servo-amplifier 25 and balanced against the output voltage of the frequency meter 24. The action of the motor 26 is to drive the gear train 4 until the voltage fed back from potentiometer 29 is exactly equal and opposite to the voltage output of the frequency meter 24, at which point the motor will stop. It is obvious, therefore, that the system will be a self-balancing servo loop.

It is well known that the speed of sound in water varies according to the temperature of the water, salinity, and to a minor degree which can be neglected for our purposes, the pressure. The general formula for the speed of sound in water is as follows:

$$v=4626+13.8(T)-0.12T^2+3.73S \quad (11)$$

Where:

v is the velocity of the sound in water in feet per second;

T is the temperature of the water in degrees Centigrade; and

S is the salinity of the water measured in parts per thousand.

It has been determined that salinity varying from fresh water to that having a saline content of 40 parts per thousand by weight, will cause a variation in the speed of sound in water of about 3.5% ±0.25% depending on the temperature. Variations in temperature, from −2° C. to +30° C. will cause a change of 7.3% ±0.12%, depending on salinity. These figures show that an 11% change in the speed of sound in water would be possible, if traveling from the Red Sea to a fresh water lake in the Antarctic. In order to compensate for the change in temperature of the water, a temperature sensitive resistance network 31 is immersed in the water having its output connected across the terminals of potentiometer 29. Therefore, as the temperature of the water changes, the resistance of the temperature-sensitive resistance member changes, thereby causing a change in the voltage across potentiometer 29. This results in a different feedback voltage to appear across the operating arm 30 thereby changing the voltage feedback to the servo-amplifier 25. This new feedback voltage being balanced against the output voltage of the frequency meter 24 will cause motor 26 to drive the gear train 4 to a new indicating position dependent on this temperature change.

The salinity factor is not made automatic, since it is not expected to vary as frequently and rapidly as that due to temperature. A potentiometer 32 is placed in series with the parallel combination of potentiometer 29 and the temperature sensitive resistance network 31. It is only necessary therefore in any fixed body of water to determine from a chart the salinity content and then manually set this reading on the manual salinity control potentiometer 32. One end of the salinity potentiometer 32 is connected to a B+ voltage and the other to the parallel combination of potentiometer 29 and the temperature sensitive network 31.

To vary the transmitted frequency over the entire doppler range of 690 to 700 kilocycles will require a frequency variation of only 1.4% which can easily be made linear. A higher carrier frequency may be used, since the log system is independent of the specific carrier frequency used.

In order to indicate speed, a speed counter 33 is mechanically coupled by gear 34 to gear train 4. For remote speed output orders, a Selsyn generator 35 is mechanically coupled to gear train 4 by means of gear 36.

To indicate distance, a second servo-amplifier 37 is connected to the operating arm 30 of potentiometer 29. This voltage at potentiometer 29 is a voltage that represents the ship's speed. The output of servo-amplifier 37 drives motor 38 which, in turn, is mechanically coupled to gear train 39 by means of gear 40. A tachometer generator 41 is mechanically coupled to gear train 39 by means of gear 42. The output of said tachometer generator 41 is fed back to servo-amplifier 37 where it is used to maintain the speed of motor 38 as determined by the ship's speed voltage obtained from potentiometer 29. A distance counter 43 is mechanically coupled to gear 44 which, in turn, is coupled to gear train 39. In order to obtain distance output orders, a Selsyn generator 45 is also mechanically coupled to gear train 39 through gear 46. It will be observed that gear train 39 will be continuously turning at a rate depending on the ship's speed.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein except as defined by the appended claims.

What is claimed is:

1. A velocity determining system comprising a variable oscillator, means for transmitting wave energy into a medium, said transmitting means being coupled to said oscillator whereby said oscillator determines the frequency of transmitted energy, frequency varying means associated with said oscillator, means for receiving reflections of transmitted wave energy, a comparator coupled to said receiving means and said oscillator for comparing the frequencies of transmitted and received singals to derive a control signal, and means coupled to said comparator and responsive to said control signal for actuating said frequency varying means to cause the frequency of the wave energy in said medium to be constant.

2. A velocity determining system comprising a variable oscillator, means for transmitting wave energy into a medium, said transmitting means being coupled to said oscillator whereby said oscillator determines the frequency of transmitted energy, frequency varying means associated with said oscillator, means for receiving reflections of transmitted wave energy, a comparator coupled to said receiving means and said oscillator for comparing the frequencies of transmitted and received signals to derive a control signal, means coupled to said comparator and responsive to said control signal for actuating said frequency varying means to cause the frequency of the wave energy in said medium to be constant, and a speed indicator connected to said frequency varying means.

3. A velocity determining system comprising a variable oscillator, means for transmitting wave energy into a medium, said transmitting means being coupled to said oscillator whereby said oscillator determines the frequency of transmitted energy, frequency varying means associated with said oscillator, means for receiving reflections of transmitted wave energy, a comparator coupled to said receiving means and said oscillator for comparing the frequencies of transmitted and received signals to derive a control signal, means coupled to said comparator and responsive to said control signal for actuating said frequency varying means to cause the frequency of the wave energy in said medium to be constant, a speed indicator connected to said frequency varying means, a temperature sensitive device responsive to changes in the temperature of said medium, and means coupling said temperature sensitive device to said frequency varying means to compensate said frequency varying means for changes in the temperature of said medium.

4. A velocity determining system for use on a vehicle comprising a variable oscillator, a transducer for transmitting wave energy into a liquid medium through which said vehicle moves, said transmitting means being coupled to said oscillator whereby said oscillator determines the frequency of transmitted energy, frequency varying apparatus associated with said oscillator, means for receiving reflections of transmitted wave energy, a comparator coupled to said receiving means and said oscillator for comparing the frequencies of transmitted and received wave energy to derive a control signal, means coupled to said comparator and responsive to said control signal for actuating said frequency varying apparatus to cause the frequency of wave energy in said medium to be constant, indicator means connected to and controlled by said frequency varying apparatus for indicating the speed of said vehicle, a temperature sensitive device responsive to changes of temperature of said liquid medium, means coupling said temperature sensitive device to said frequency varying apparatus to compensate said apparatus for changes in the temperature of said medium, and a salinity compensating control connected to said frequency varying apparatus.

5. A velocity determining system for use on a vehicle comprising, a variable oscillator, means for transmitting wave energy into a medium through which said vehicle moves, said oscillator being coupled to said transmitting means, means for receiving reflections of transmitted wave energy, dual channel means connected to said reflection receiving means including a broad band receiver channel and a narrow band receiver channel, a switch, a heterodyne device, means associated with said switch to couple the output of one of said receiver channels to said heterodyne device, means coupling the output of said oscillator to said heterodyne device, a filter connected to the output of said heterodyne device, frequency varying means connected to said oscillator, and means connected to the output of said filter and responsive to the frequency thereof for actuating said frequency varying means to cause the frequency of wave energy in said medium to be constant.

6. A velocity determining system for use on a vehicle comprising, a variable oscillator, means for transmitting wave energy into a medium through which said vehicle moves, said oscillator being coupled to said transmitting means, means for receiving reflections of transmitted wave energy, dual channel means coupled to said receiving means including a broad band receiver channel and a tunable narrow band receiver channel, a switch, a heterodyne device, means associated with the output of said narrow band receiver channel to cause said switch to couple said narrow band receiver channel to said heterodyne device when an amplified signal is present at the output of said narrow band receiver channel, said switch being biased to couple said broad band receiver channel to said heterodyne device in the absence of an amplified output signal at said narrow band receiver channel, frequency varying apparatus connected to said oscillator, means connected to the output of said heterodyne device and responsive to the frequency thereof for actuating said apparatus to cause the frequency of wave energy in said medium to be constant, and means connected to said apparatus and said narrow band receiver channel for turning said narrow band receiver channel whereby received signals may be amplified therein.

References Cited in the file of this patent

UNITED STATES PATENTS

| | | |
|---|---|---|
| 1,864,638 | Chilowsky | June 28, 1932 |
| 2,078,769 | Moore | Apr. 27, 1937 |
| 2,235,019 | Johannson | Mar. 18, 1941 |
| 2,536,255 | Bedford et al. | Jan. 2, 1951 |
| 2,537,593 | Landon et al. | Jan. 9, 1951 |
| 2,621,243 | Sunstein | Dec. 9, 1952 |
| 2,841,775 | Saunders | July 11, 1958 |
| 2,859,433 | Saxton | Nov. 4, 1958 |

UNITED STATES PATENT OFFICE
CERTIFICATION OF CORRECTION

Patent No. 2,964,729                  December 13, 1960

John N. Beebe

It is hereby certified that error appears in the above numbered patent requiring correction and that the said Letters Patent should read as corrected below.

Column 2, line 51, for "transmitter" read -- transmitting --; column 5, line 53, for "singals" read -- signals --; column 7, line 4, for "turning" read -- tuning --.

Signed and sealed this 30th day of May 1961.

(SEAL)
Attest:

ERNEST W. SWIDER
Attesting Officer

DAVID L. LADD
Commissioner of Patents